UNITED STATES PATENT OFFICE.

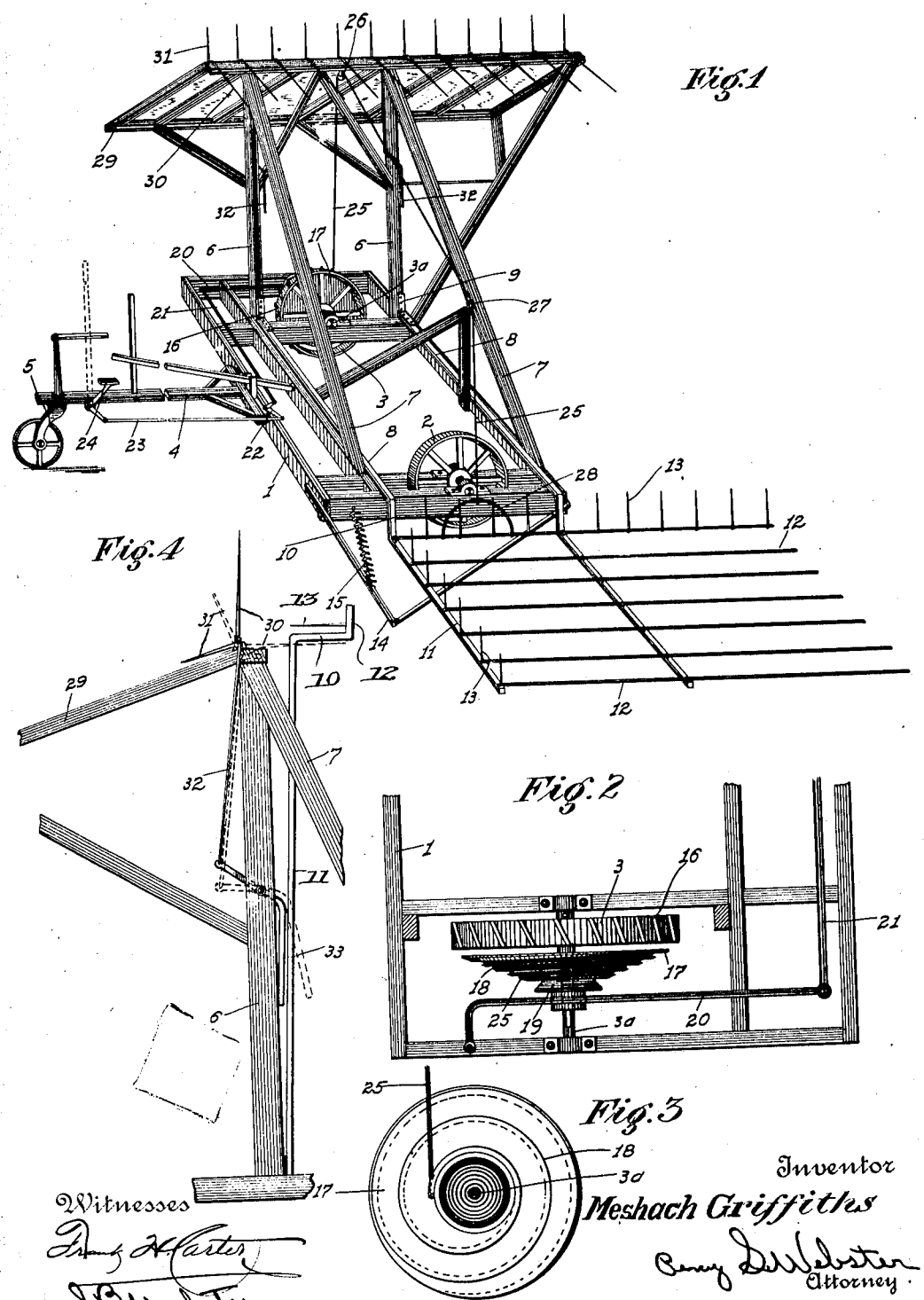
M. GRIFFITHS.
HAY LOADER.
APPLICATION FILED JULY 19, 1911.
1,035,580.
Patented Aug. 13, 1912.
Inventor
Meshach Griffiths

MESHACH GRIFFITHS, OF DANA, CALIFORNIA.

HAY-LOADER.

1,035,580.	Specification of Letters Patent.	Patented Aug. 13, 1912.

Application filed July 19, 1911. Serial No. 639,380.

*To all whom it may concern:*

Be it known that I, MESHACH GRIFFITHS, a citizen of the United States, residing at Dana, in the county of Shasta, State of California, have invented certain new and useful Improvements in Hay-Loaders; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in hay loaders for loading hay from the shock into the wagon, the object of the invention being to produce such a loader as will readily, quickly and effectively pick the hay from the shock and deliver it into the wagon without the necessity of stopping the loader and backing it or otherwise losing time, as is the case of so many of the present commonly used hay loaders.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a perspective view of the complete device. Fig. 2 is a top plan view of a driving wheel and lifting drum. Fig. 3 is an end view of the lifting drum. Fig. 4 is a fragmentary view of a hay rack operating means.

Referring now more particularly to the characters of reference on the drawings, I first provide a main rectangular frame 1 mounted on wheels 2 and 3 and having a rearwardly projecting tongue 4 mounted on a guide wheel 5, the horse for driving the rig being hitched to the tongue 4 and driving the frame 1 in front of it. On the frame 1 is a suitable vertical rectangular frame 6 supported by oblique beams 7.

The numeral 8 designates bars hinged to the frames 6 as at 9 and projecting normally parallel with and along the top of the frame 1 and having downwardly projecting ends 10 carrying projecting arms 11 supporting a hay rack or buck 12 having inner and rear guard teeth 13. This rack or buck 12 rests normally on a triangular frame 14 pivoted to the frame 1 and having a supporting spring 15 which allows the frame 12 certain flexibility in moving over the uneven surfaces of the earth.

The wheel 3 has tractive members 16 for said wheel to drive around with the forward movement of the frame 1, and on the shaft 3ª of said wheel 3 is loosely mounted a driving drum 17, having a substantially spiral groove 18 in its face, there being fixed to said shaft 3ª a clutch 19 adapted to be thrown into engagement with said drum by means of a lever 20 connected by a lever 21 with a bell crank 22 driven by a link 23 from a foot or hand lever 24 within reach of the driver of the hay loader.

In practice, the rack 12 is driven under the shock of hay or straw, the guard teeth 13 holding the hay in position on said rack, and then the clutch 19 is connected with the drum 17, as described, causing said drum to rotate and wind up a cable 25 connected over pulleys 26 and 27 with a bar 28 on the rack 12, which causes the rack to be pulled upward and by reason of the spiral groove 18 it is started slowly at first as is necessary, and as it reaches the point where it is at an angle, and the hay is liable to slide off, it is carried much more quickly and the hay deposited upon a flat inclined platform 29, held on the top of the frame 26.

At the upper edge of the platform 29 is a hay rack consisting of teeth 30 and 31 disposed obliquely with respect to each other, the teeth 30 normally projecting downwardly, as shown, until the teeth 13 engage therebetween, and just as this occurs, the rack 12 strikes a bell crank 32 which operates a link 33 which drives the teeth 30 to vertical position and the teeth 31 to inclined position downwardly over the platform 29, which throws the hay from off the rack 12 on to said platform 29, and then the clutch 19 is released, and the rack 12 drops back to operative position. As the member 12 reaches its uppermost position the load of hay on the same becomes heavier on the side toward the chute 29 and the greater portion of the same falls off by gravity upon said chute. The purpose of the members 30 is to sweep the small amount remaining onto the slide in order to fully clear the member 12 of its complete load each time.

From the foregoing description it will readily appear that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

A device of the character described comprising a main frame mounted on wheels, an inclined platform held above said main frame, a shiftable rack mounted on the edge of said inclined platform, a hay rack hinged to said main frame and adapted to be lifted to discharge on said inclined platform, and means for shifting said shifting rack just as said hay rack is in a position to discharge upon said inclined platform, as described.

In testimony whereof I affix my signature in presence of two witnesses.

MESHACH GRIFFITHS.

Witnesses:
JOSHUA B. WEBSTER,
FRANK H. CARTER.